(12) United States Patent
Woods et al.

(10) Patent No.: US 7,834,566 B2
(45) Date of Patent: Nov. 16, 2010

(54) GENERIC MOTOR CONTROL SYSTEM

(75) Inventors: Samuel G. Woods, Bel Air, MD (US);
Michael K. Forster, White Hall, MD (US); John C. Vanko, Timonium, MD (US); Daniele C. Brotto, Baltimore, MD (US); Brian R. Crowell, Greenville, NC (US); Jason K. Leh, Parkville, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 12/629,099

(22) Filed: Dec. 2, 2009

(65) Prior Publication Data
US 2010/0079097 A1    Apr. 1, 2010

Related U.S. Application Data

(60) Division of application No. 11/159,948, filed on Jun. 23, 2005, now Pat. No. 7,646,155, which is a continuation-in-part of application No. 10/426,589, filed on Apr. 30, 2003, now Pat. No. 7,102,303.

(51) Int. Cl.
H02P 1/00       (2006.01)
H02P 3/00       (2006.01)
H02P 5/00       (2006.01)
(52) U.S. Cl. ................. 318/255; 318/34; 318/55; 388/937
(58) Field of Classification Search .......... 318/255, 318/34, 55; 388/937
See application file for complete search history.

(56) References Cited

U.S. PATENT DOCUMENTS 4,028,599 A    6/1977  Zankl et al.
4,307,325 A   12/1981  Saar
4,550,277 A   10/1985  Carney
4,577,269 A    3/1986  Abbondanti
4,628,233 A   12/1986  Bradus
4,673,850 A    6/1987  Maudlin (Continued)

FOREIGN PATENT DOCUMENTS

EP    0496549 B1    7/1992

(Continued)

OTHER PUBLICATIONS

"Single-Chip 8-Bit CMOS Microcomputer," Dec. 26, 1997, Mitsubishi Microcomputers 3802 Group, Mitsubishi Electric, Rev. 1.0, p. 51.

*Primary Examiner*—Walter Benson
*Assistant Examiner*—Erick Glass
(74) *Attorney, Agent, or Firm*—Harness, Dickey & Pierce, P.L.C.

(57) ABSTRACT

A method for controlling the operation of a motor utilizing a generic motor control module. The method includes sampling at least one motor operating criterion during operation of the motor and executing a generic control algorithm at a predetermined periodic interval. Execution of the algorithm provides a firing angle, duty cycle, or other suitable control function solution for an electronic valve for each periodic interval, thereby controlling the behavior of the motor. Additionally, the method includes firing the electronic valve at the calculated timing during each periodic interval such that the motor functions in accordance with desired motor operational parameters.

15 Claims, 4 Drawing Sheets

U.S. PATENT DOCUMENTS

| | | |
|---|---|---|
| 4,689,534 A | 8/1987 | Gerber et al. |
| RE33,379 E | 10/1990 | Bradus |
| 5,079,410 A | 1/1992 | Payne et al. |
| 5,170,851 A | 12/1992 | Kress et al. |
| 5,486,747 A | 1/1996 | Welch |
| 5,978,547 A | 11/1999 | Reynolds et al. |
| 5,986,417 A | 11/1999 | Nicolai et al. |
| 6,194,856 B1 | 2/2001 | Kobayashi et al. |
| 6,232,734 B1 | 5/2001 | Anzai |
| 6,320,286 B1 | 11/2001 | Ramarathnam |
| 6,329,778 B1 | 12/2001 | Culp et al. |
| 6,390,205 B2 | 5/2002 | Wallgren et al. |
| 6,462,494 B1 | 10/2002 | Schone et al. |
| 7,007,762 B2 | 3/2006 | Yamamoto |
| 7,102,303 B2 | 9/2006 | Brotto |
| 2002/0134811 A1 | 9/2002 | Napier et al. |
| 2002/0190687 A1 | 12/2002 | Bell et al. |
| 2004/0085193 A1 | 5/2004 | Crowell |

FOREIGN PATENT DOCUMENTS

| | | |
|---|---|---|
| EP | 0684692 A2 | 11/1995 |
| EP | 0741450 A1 | 11/1996 |
| GB | 2058405 A | 4/1981 |
| WO | WO-03007467 A1 | 1/2003 |

GENERIC MOTOR CONTROL SYSTEM

CROSS REFERENCE TO RELATED APPLICATIONS

This application is a divisional of U.S. patent application Ser. No. 11/159,948 filed on Jun. 23, 2005, which claims priority to U.S. patent application Ser. No. 10/426,589 filed on Apr. 30, 2003 (now U.S. Pat. No. 7,102,703). The disclosures of the above applications are incorporated herein by reference.

FIELD OF INVENTION

The invention relates generally to systems and methods for controlling the operation of a motor. More specifically, the invention relates to a generic motor control module suitable for use with any of a variety of motors in any of a variety of motor applications.

BACKGROUND OF THE INVENTION

Typically, motors are controlled by dedicated analog or digital circuitry configured to control a specific motor in a specific application. For example, one dedicated circuit would be required to control a specific motor utilized in a power saw application, while another dedicated circuit would be required to control a different motor utilized in a drill application. Or further yet, one dedicated circuit would be required to control the motor utilized in a power saw application, while a different circuit would be required to utilize the same motor in a table saw application. Normally, each dedicated analog or digital control circuit would be constructed of different components. These components would typically have differing values and/or control software in order to create a unique operational characteristic profile for each motor and each specific motor application.

The requirement of different dedicated control circuitry for different motors and different applications greatly increases manufacturing, engineering design, parts, inventory and labor costs. This is because, up until the present time, no one 'generic' or 'universal' control circuit or module was available that could be easily tailored to meet the operational needs of different types of applications (e.g. drills, saws, grinders, etc.). Thus, there has existed a need for a single control circuit or module that can easily be tailored to control and optimize performance of a given one of a plurality of differing motors in a given one of a plurality of differing motor applications that require different operational characteristics.

BRIEF SUMMARY OF THE INVENTION

In one preferred embodiment of the present invention a method is provided for controlling the operation of a motor utilizing a generic motor control module. The method includes sampling at least one motor operating criterion (i.e. one dynamic pertinent motor input) during operation of the motor and executing a control algorithm at a predetermined periodic interval. Execution of the algorithm provides an operational timing for an electronic valve for each periodic interval, thereby controlling the operational behavior of the motor. For example, execution of the algorithm determines a firing angle solution for the electronic valve if the motor is an AC motor or a duty cycle for the electronic valve if the motor is DC motor. Additionally, the method includes firing the electronic valve at the calculated firing angle during each periodic interval such that the motor functions in accordance with desired operational parameters.

In another preferred embodiment, a generic motor control module is provided. The generic motor control module includes a memory device for storing a control algorithm. A processor is included for executing the control algorithm to determine an operational timing for an electronic valve at a predetermined periodic interval. For example, execution of the algorithm determines a firing angle solution for the electronic valve if the motor is an AC motor or a duty cycle for the electronic valve if the motor is DC motor. The generic motor control module additionally includes an alterable memory device for storing at least one function coefficient used during execution of the control algorithm. The function coefficient is specific to a particular motor operation and/or application such that the control module is suitable for controlling the operation of any one of a plurality of motors in any one of a plurality of motor applications (e.g. different power tools).

BRIEF DESCRIPTION OF THE DRAWINGS

The present invention will become more fully understood from the detailed description and accompanying drawings, wherein.

DETAILED DESCRIPTION OF THE INVENTION

Figure 1:
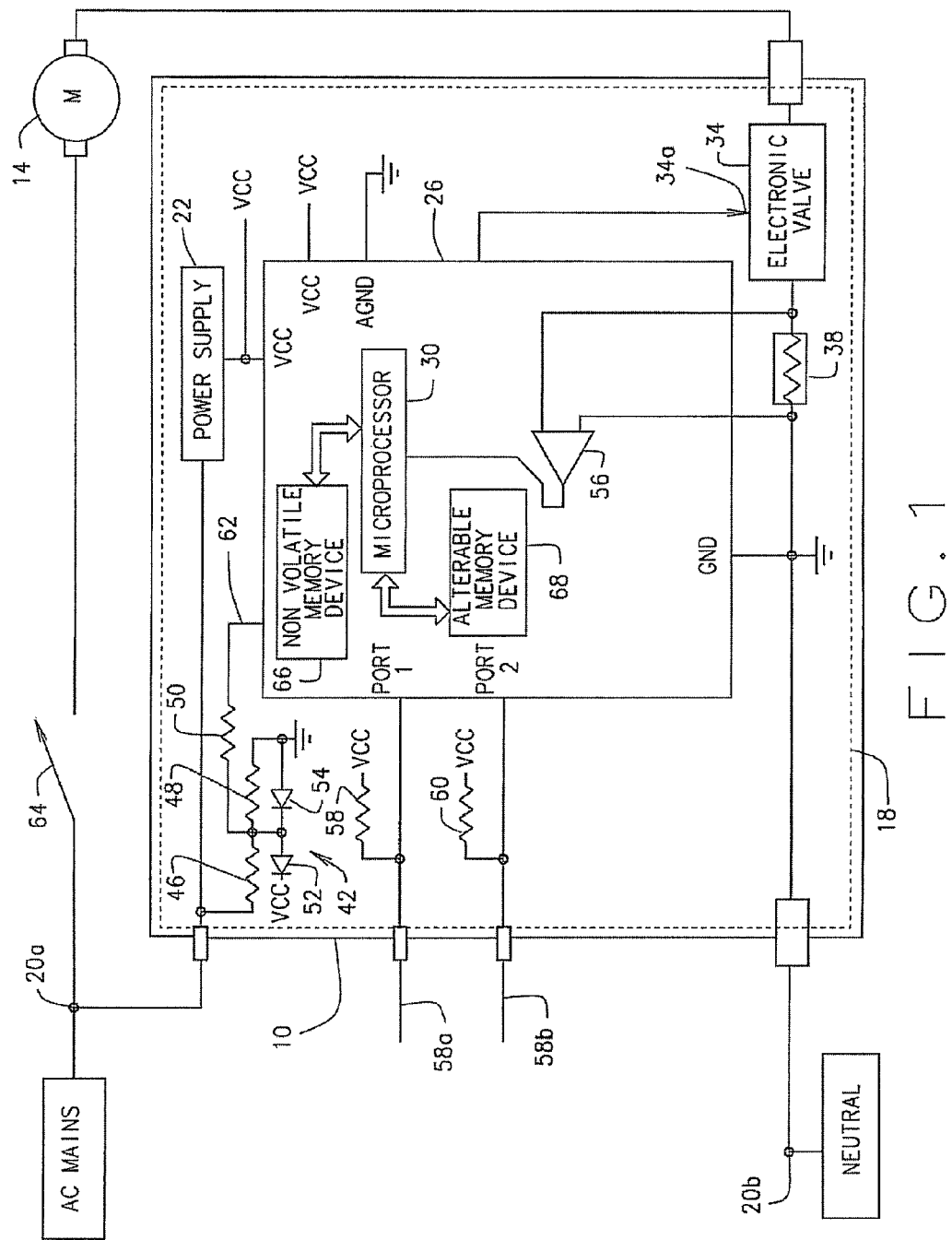
FIG. 1 is a simplified circuit diagram of a generic motor control module, in accordance with one preferred embodiment of the present invention.
Figure 3:
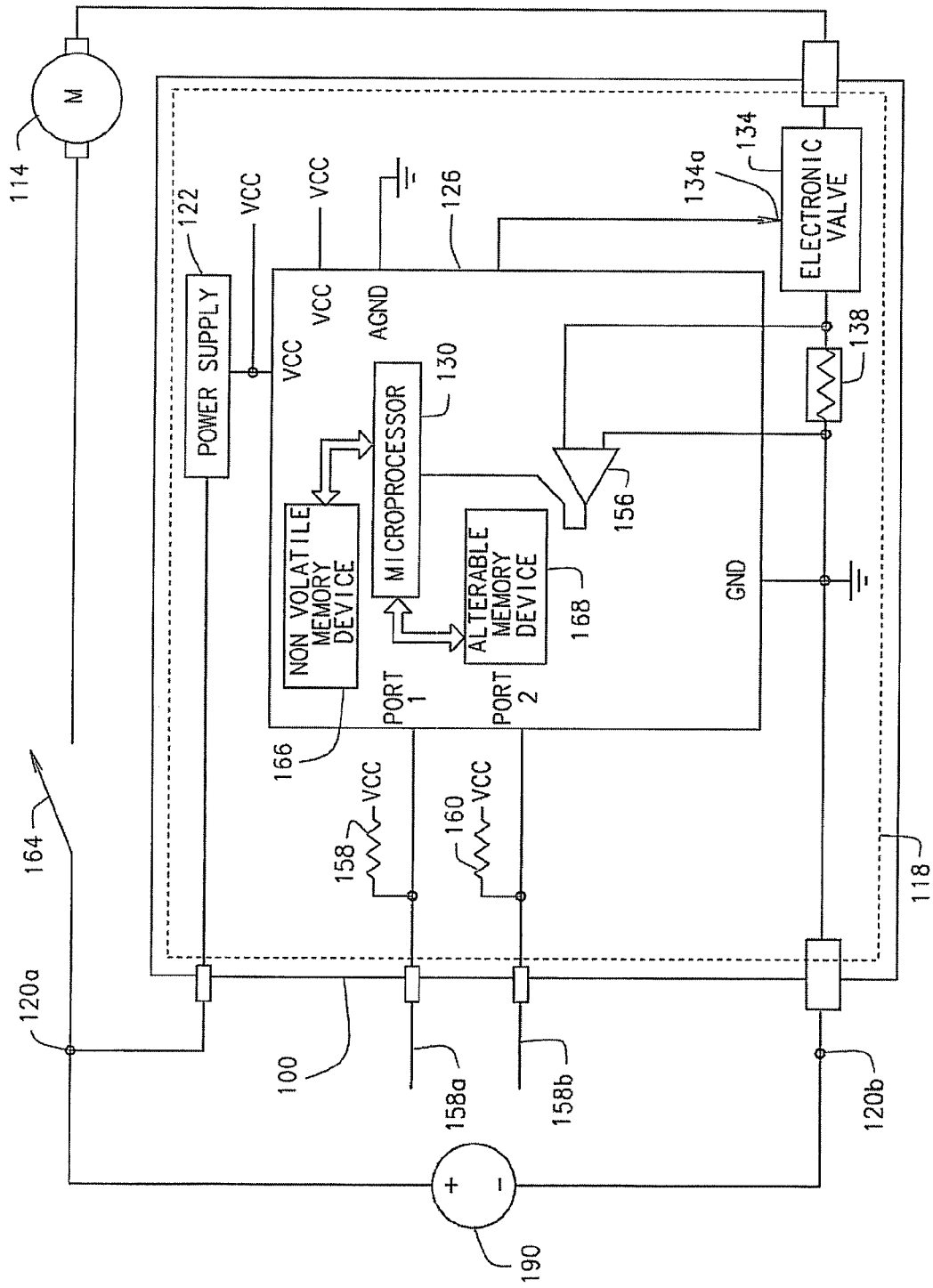
FIG. 3 is a simplified circuit diagram of the generic motor control module 10 as utilized in a DC implementation, wherein the motor 14 is a DC motor.

FIG. 1 is a simplified circuit diagram of a generic motor control module 10, in accordance with one preferred embodiment of the present invention. The generic motor control module 10 is connectable to a motor 14 that can be any one of a plurality of motors used in any one of a plurality of applications. The motor 14 can be an AC motor, as illustrated in FIG. 1 or a DC motor as illustrated in FIG. 3. The generic motor control module 10 is also referred to herein as the universal control module 10 because it is universally applicable such that it is capable of controlling any of the plurality of motors, such as motor 14, in any of the plurality of motor applications or implementations. More specifically, the generic motor control module 10 is capable of controlling motors of differing size, ratings and/or types, wherein the motors can be utilized in any of a plurality of applications or implementations without altering components, component values, and/or hard coded control software. Preferably, the generic motor control module 10 is a digital control module that includes a digital control circuit, generally indicated at 18.

For example, the generic motor control module 10 can be used to control the motor of a heavy duty half-inch drill that has a high gear ratio and generates a high degree of torque, or to control the motor of a quarter-inch drill that has a relatively low gear ratio and generates only a small degree of torque. Similarly, the generic motor control module 10 can be utilized to control a motor used in a plurality of applications. For example, if a specific model of motor were used in both a power saw application and a drill press application, each with different operational parameters, the generic motor control module 10 can be used to control the motor in both the power saw and the drill press without the need to change any electrical components, component values, or to alter control software associated with the module 10. For simplicity, the generic motor control module 10 will be referred to hereinafter as simply the motor control module 10.

In an AC implementation, as shown in FIG. 1, the motor control module 10 is connectable to an AC power source, via the power cord (not shown), at an AC mains node 20a and a neutral node 20b. The control circuit 18 of the motor control module 10 includes a power supply 22 that supplies power to a controller 26, e.g. a microcontroller. The controller 26 includes a processor 30, e.g. a microprocessor, programmed to control an electronic valve 34, such as a triac, a field effect transistor (FET), an insulated gate bipolar transistor (IGBT), a silicon-controlled rectifier (SCR), or various voltage and/or current control devices. The controller 26 can be any suitable controller or microcontroller. One microcontroller especially well suited for use with control circuit 18 is an ATtiny26 microcontroller commercially available from ATMEL, Inc. of San Jose, Calif. To control operation of the motor 14, the controller 26 controls the amount of current, and therefore voltage, applied to the motor 14 by controlling the operation of the electronic valve 34.

The control circuit 18 further includes a shunt resistor 38 and a voltage divider circuit 42 comprised of resistors 46, 48, 50 and clamping diodes 52 and 54. The controller 26 includes an amplifier 56 used to amplify the voltage across the shunt resistor 38 used by the controller 26 to measure the current flowing through the electronic valve 34 and the motor 14. The voltage divider circuit 42 is coupled via a circuit line 62 to the controller 26. The resistors 46, 48 and 50 divide the AC source voltage to a voltage level usable by the controller 26, and the clamping diodes 52 and 54 protect the controller 26 from damage if a voltage spike occurs in the AC source voltage. The controller 26 senses an AC zero crossing by measuring the divided voltage from the AC power source via the voltage divider circuit 42. Alternatively, the controller 26 can sense an AC zero crossing by monitoring a digital signal provided by a subsystem, wherein the digital signal would represent a zero crossing of the AC voltage. The control circuit 18 also includes a pair of pull-up resistors 58 and 60 used to condition the voltage input at a 'port 1' and a 'port 2' of the controller 26.

Generally, the motor control module 10 controls the operation of the motor 14 by switching the motor current on and off at periodic intervals in relation to the zero crossing of the AC current or voltage waveform, via the controller 26 and control signals applied to a control input 34a of the electronic valve 34. These periodic intervals are caused to occur in synchronism with the AC waveform and are measured in terms of a conduction angle, measured as a number of degrees. The conduction angle determines the point within the AC waveform at which the electronic valve 34 is fired, i.e. turned on, thereby delivering electrical energy to the motor 14. More specifically, the conduction angle determines the point at which the electronic valve 34 is fired within a selected period of the AC waveform for which operation of the electronic valve 34 is based, for example, a half-cycle of the AC waveform. The electronic valve 34 turns off at the conclusion of the selected period. Thus, the conduction angle is measured from the point of firing of the electronic valve 34 to the point of extinguishing at the end of the selected period.

The point at which the electronic valve is fired is also referred to in the art, and will alternatively be referred to herein, as the firing angle of the electronic valve 34. The firing angle is measured from the beginning of the selected period to the point within the selected period at which the electronic valve 34 is fired. Numerically, the conduction angle and the firing angle are complements of one another. Generally, the conduction angle and firing angle are measured in units of degrees, but could also be measured in radians, or in unitless fractions of the selected period.

For example, a conduction angle of 180° per half cycle of the AC cycle corresponds to a condition of full conduction, in which electronic valve 34 is fired such that the entire, uninterrupted alternating current is applied to the motor 14. That is, the electronic valve 34 is fired such that current flows through the electronic valve 34 for the entire half cycle of the AC input signal. Similarly, a 90° conduction angle corresponds to developing the supply voltage across the motor 14 commencing in the middle of a given half cycle, and thus the electronic valve 34 is fired so that approximately half of the available energy is delivered to the motor. Conduction angles below 90° correspond to firing of the electronic valve 34 later in a given half cycle so that even lesser quantities of energy are delivered to the motor 14.

The motor control module 10 controls the operation of the motor 14 when a motor control switch 64, e.g. a tool On/Off switch, is placed in a closed (i.e. 'On') position, thereby allowing current to flow through the motor 14. Although motor control switch 64 is illustrated as being located between the node 20a and the motor 14, alternatively, the motor control switch 64 can be located between the node 20a and the AC mains. In one preferred embodiment, the control circuit 18 determines a firing angle solution for the electronic valve 34 for each half cycle of the AC line voltage. Alternatively, the control circuit 18 could determine the firing angle solution for each full cycle, each one and a half cycle, each two cycles, or any other predetermined periodic interval of the AC line voltage signal based on multiples of the half cycle. Although the present invention will be described herein as determining the firing angle solution based on a half cycle, it should be understood that the determination of the firing angle solution could be based on any multiple of the half cycle and remain within the scope of the present invention.

To determine the firing angle solution for each half cycle such that the motor 14 will operate in a desired manner, various pertinent inputs, i.e. motor operating criterion, are measured during operation of the motor 14. The various pertinent inputs are referred to herein as "Dynamicisms" and include, but are not limited to, such things as a closed loop dial, an open loop dial, an amount of current flowing through the motor 14 during operation, the voltage across the motor 14 during operation, an amount of torque provided by the motor 14, and a speed of the motor 14. For example, a first input 58a could be a closed loop dial signal, or a tachometer signal or any other dynamicism signal. Likewise, a second input 58b could be a motor speed signal, or an open loop dial signal or any other dynamicism signal. Dynamicisms include any motor operational value or parameter that has an effect on the calculation of the firing angle solution. As the dynamicisms change during operation, the firing angle solution for each subsequent half cycle, or other periodic interval based on half cycles, will also change.

To generate a timing solution for the electronic valve 34, i.e. the timing and duration for which the electronic valve 34 is turned on, the processor 30 executes a universal generic control algorithm stored in a memory device 66 included in the controller 26. More specifically, the firing angle solution for each half cycle, or multiple thereof, of the AC line during operation of the motor 14, the processor 30 executes a universal generic firing angle control algorithm. Alternatively, the memory device 66 could be included in the motor control module 10 external to the controller 26. In various embodiments the memory device 66 is a functionally non-volatile, non-alterable memory device. For example, memory device 66 can be a read only memory (ROM) device, a Flash Memory device or a one time programmable (OTP) device. In one preferred embodiment, the generic firing angle algorithm is hard-coded in the memory device 66 during manufacturing of the motor control module 10. That is, the generic algorithm is stored in non-volatile memory device 66 as part of the process for manufacturing the motor control module 10 and can not be altered or modified once it is stored in the memory device 66. Thus, the generic algorithm is applicable to determine the firing angle solution for any of a plurality of motor applications in which any of a plurality of motors, such as motor 14, are controlled by the motor control module 10. More specifically, the generic algorithm determines the firing angle solution for any motor 14 in which the motor control module 10 is installed, such that the motor 14 operates according to parameters specifically required for the particular motor application.

In various alternative embodiments the generic algorithm can be stored in alterable memory that allows data to be stored, read and altered such as flash memory, erasable programmable read-only memory (EPROM) or electrically erasable programmable read-only memory (EEPROM).

The processor 30 executes the generic algorithm utilizing the dynamicisms as inputs, thereby determining a firing angle solution specific to the particular motor 14 and the specific motor application. Generally, the generic algorithm can be expressed by the following equation:

Firing angle solution=$f$(dynamicisms)

It should be understood that the notation 'f( )' means 'a function of ( )', where the contents of the parentheses are the argument of the function f.

For example, in one preferred embodiment, the generic algorithm could be more specifically expressed by the following equation.

Firing angle solution=$f(f$(switch position)+$f$(dial setting 1)+$f$(dial setting 2)+$f$(current)+$f$(voltage)+$f$(tachometer)+ . . . $f$(dynamicism $n$)+$K$)+$M$;

where 'switch position' refers to the position of the motor control switch 64, 'dial setting 1' refers to closed loop desired speed, 'dial setting 2' refers to open loop firing angle clamp, 'current' refers to the amount of current flowing through the motor 14, 'voltage' refers to a voltage value across the motor 14, 'tachometer' refers to a tachometric period or rate of rotational speed of the motor, and K and M are offsets or constants to bias the firing angle into the correct working range of operation for the particular implementation of the motor 14. The tachometer period is the time period that is directly proportional to the inverse of the speed of the motor 14. The motor control switch 64 controls the operational status of the motor 14. That is, if the motor control switch 64 is in an open position, the motor 14 is in an 'Off' operational status, while if the motor control switch 64 is in a closed position, the motor 14 is in an 'On' operational status.

The controller 26 samples the dynamicisms using appropriate sensors or sensing circuits (not shown) for each dynamicism and utilizes the processor 30 to execute the generic algorithm to determine the proper firing angle solution for the electronic valve 34 for each half cycle of the AC line voltage. Additionally, the generic algorithm utilizes at least one motor function coefficient stored in a memory device 68 to determine the firing angle solution such that the motor 14 functions in accordance with motor operational parameters specific to the particular application of the motor 14. Generally, the motor operational parameters of a given application will require the use of more than one function coefficient in the execution of the generic algorithm. In various embodiments, the motor function coefficient is a soft-coded function coefficient and the memory device 68 is an alterable memory device that allows data to be stored, read and altered such as flash memory, erasable programmable read-only memory (EPROM) or electrically erasable programmable read-only memory (EEPROM). Alternatively, the memory device 68 can be a functionally non-volatile, non-alterable memory device, such as a read only memory (ROM) device, a Flash Memory device or a one time programmable (OTP) device.

In one preferred embodiment, the function coefficient(s) are stored in the alterable memory device 68 subsequent to the manufacturing of the motor control module 10 and subsequent to the motor control module 10 being implemented in a particular application. For example, if the control module 10 is utilized to control the motor 14 of a hammer drill, the function coefficient(s) specific to the motor operational parameters of the hammer drill are not stored in the alterable memory device 68 until after the hammer drill has been assembled including the motor control module 10. Thus, after the exemplary hammer drill is assembled including the motor control module 10, an external device (not shown) capable of communicating with the controller 26 is used to program (i.e. store) the function coefficient(s) in the alterable memory device 68. The external device communicates the function coefficient(s) to the alterable memory device 68 over any suitable means for data transmission. For example, the function coefficient(s) can be transmitted from the external device to the alterable memory device 68 over the power cord of the tool, e.g. the hammer drill. The external device can be any computer-based device capable of transmitting data, such as a laptop computer, a hand-held computer or any other programming device. Alternatively, the module 10 could be programmed after its manufacture but before being implemented in a particular application.

A further derivation of the generic algorithm incorporating the function coefficient(s) can be expressed by summing the products of the dynamicism(s) and associated function coefficient(s), as illustrated by the following equation.

Firing angle solution=$f$((switch position*$C_0$)+((dial setting 1*$C_1$)+(dial setting 2*$C_2$)+(current*$C_3$)+(voltage*$C_4$)+(tachometer*$C_5$)+ . . . (dynamicism $n$*$C_n$)+$C_{n+1}$)+$C_{n+2}$);

where the value for 'switch position' equals one (1) if the motor control switch 64 is in a closed (i.e. 'On') position and zero (0) if the motor control switch 64 is in an open (i.e. 'Off') position. Additionally, $C_0$, $C_1$, $C_2$, $C_3$, $C_4$, $C_5$ . . . $C_n$, $C_{n+1}$, $C_{n+2}$ are function coefficients specific to a particular application of the motor 14, so that the motor 14 operates in accordance with desired motor operational parameters of the particular application.

Thus, if a particular dynamicism is to have no impact on the firing angle solution for the electronic valve 34 in a given application, the function coefficient of that particular dynamicism would be zero (0). For example, if the motor control module 10 is implemented in an application where open loop control is desirable, $C_2$, $C_3$, $C_4$ and $C_5$, in the above generic algorithm, would be zero (0). However, if the motor control module 10 is implemented in an application where closed loop control is desirable, but there is no tachometer utilized in the application, then $C_1$, $C_2$, $C_3$ and $C_4$ would have values calculated to operate the motor 14 in accordance with desired motor operational parameters, and $C_5$ would be zero (0).

Therefore, in one preferred embodiment, the processor 30 executes the generic algorithm during each half cycle of the AC power source, implementing the function coefficient(s), stored in alterable memory device 68, as a constant value(s) in the algorithm, and utilizing the dynamicism(s) as an input variable(s) to determine the firing angle solution for the electronic valve 34, for each given half cycle. Alternatively, the controller 26 could execute the generic algorithm based on multiples of the half cycle, as opposed to executing the generic algorithm during each half cycle. In this instance each firing angle solution calculated will be used to fire the electronic valve 34 for two or more consecutive half cycles. That is, although the electronic valve 34 will be fired during each half cycle based on the firing angle solution generated by execution of the generic algorithm, the generic algorithm will not be executed during each half cycle.

Since the dynamicism(s) is a variable, the calculated firing angle solution will change during operation of the motor 14 due to variations in load requirements for the motor 14 during operation and changes in function settings of the device in which the motor 14 is installed. For example, if the load requirement of the motor 14 changes during operation, the dynamicism for the current and/or the voltage being used by the motor 14 will change leading to a change in the firing angle solution to compensate for the change in power needed by the motor 14. Additionally, if a user changes the speed setting on a power drill, the associated dynamicism(s) will change, thereby altering the firing angle solution generated by the generic algorithm.

Although, in the various preferred embodiments described herein, the motor control module 10 has been described to execute the generic algorithm shown above, it should be appreciated that the particular algorithm described is exemplary only. As such the description of the exemplary algorithm does not exhaust all possible algorithms for use in implementing the motor control module 10, in accordance with the present invention. Accordingly, changes in the algorithm described above may be made by those skilled in the art without departing from the scope of the invention. For example, the generic algorithm could utilize a look-up table as a transfer function to generate firing angle solutions, as described below.

Figure 2:
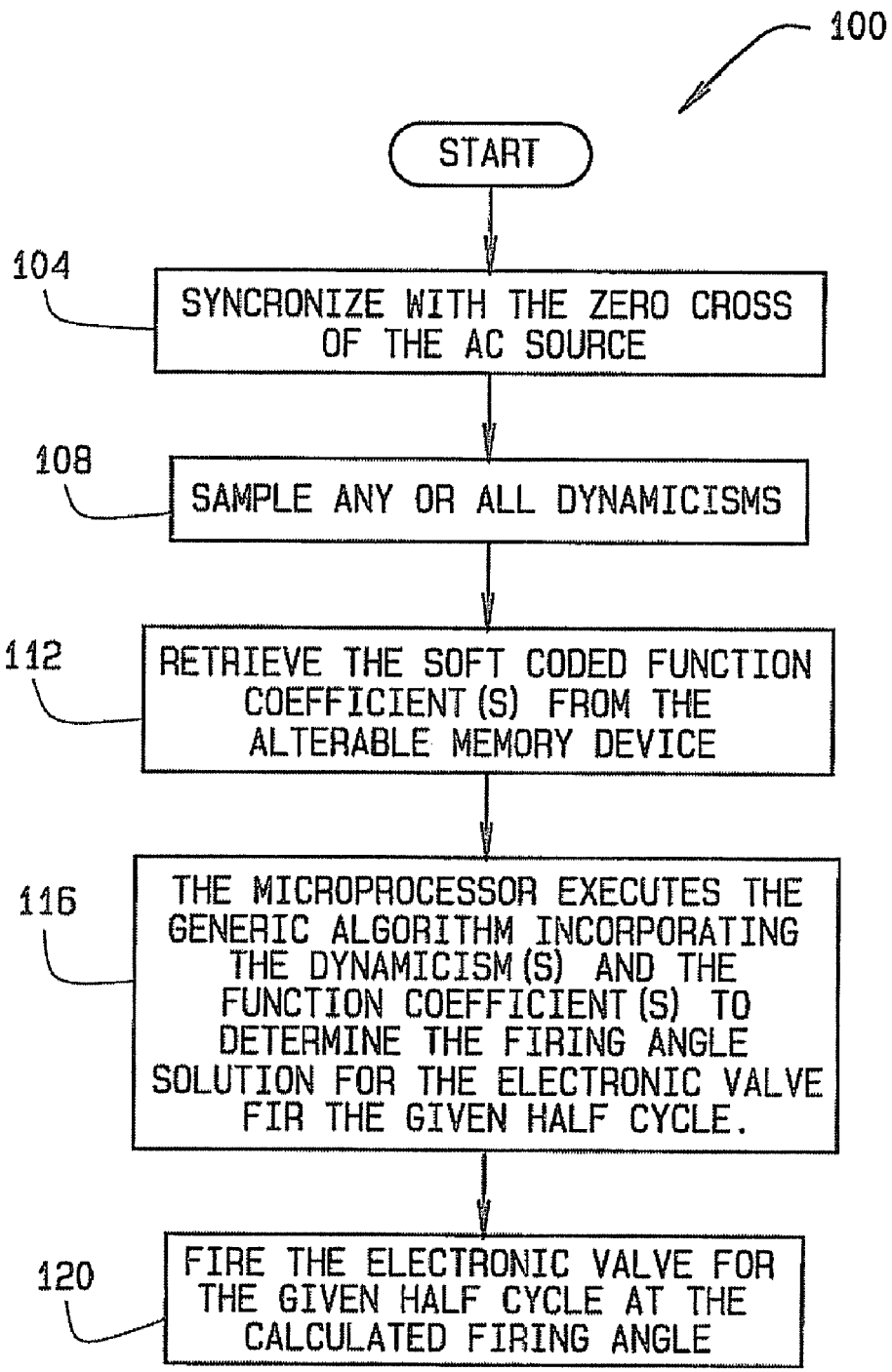
FIG. 2 is a flow chart illustrating the general operation of the generic motor control module in an AC implementation, as shown in FIG. 1.

FIG. 2 is flow chart 100 illustrating the general operation of the motor control module 10 (shown in FIG. 1), in accordance with one preferred AC embodiment of the present invention. In a practical application of the motor control module 10, on each given half cycle, or multiple thereof, the controller 26 initially synchronizes with the zero cross of the AC voltage source to acquire a reference for firing of the electronic valve 34, as indicated at step 104. Next, the controller 26 utilizes the processor 30 to sample any one, or all, dynamicism(s), as indicated at step 108. The processor 30 then retrieves the soft-coded function coefficient(s) from the alterable memory device 68, as indicated at step 112. After retrieving the function coefficient(s), the processor 30 executes the generic algorithm, incorporating the dynamicism(s) and the function coefficient(s), to determine the firing angle solution for the electronic valve for the given predetermined periodic interval, e.g. a half cycle, as indicated at step 116. The processor 30 then fires the electronic valve 34 for the given periodic interval at the calculated firing angle, thereby operating the motor 14 in accordance with motor operational parameters of the specific application of the motor 14, as indicated at step 120.

Although the generic algorithm has been described above to be hard-coded in memory device 66, in an alternate preferred embodiment, the generic algorithm is soft-coded in an alterable memory device, such as memory device 68. Thus, in this embodiment, the generic algorithm can be programmed into the motor control module 10 subsequent to the manufacturing of the motor control module 10. Additionally, by storing the generic algorithm in an alterable memory device, the generic algorithm could be modified using an external programming device, any time it is desirable to do so.

In an alternate embodiment, the firing angle solution, or duty cycle solution, described below with reference to FIG. 3, is determined using at least one look-up table stored in either the alterable or non-alterable memory devices 68 and 66. That is, look-up table(s) are used as transfer functions to control any of the plurality of motors, such as motor 14, in any one of the plurality of applications.

An address, or index, of the look-up table(s) is any one of, or any combination of, the dynamicisms suitably scaled or modified to accommodate the range of possible look-up table addresses, i.e. inputs. That is, the dynamicisms are not generally suitable to be used directly as indexes to the look-up table(s). The dynamicisms must be adjusted to accommodate the input range of the addresses to the look-up table(s). For example, the electronic valve 34 has firing angle range of 0° to 180° for normal sinusoidal AC power. Therefore, the dynamicisms must be modified or scaled to generate firing angle solutions within the range of 0° to 180°. Similarly, the motor 14 may have some specified speed range, e.g. 0 to 5000 revolutions per minute (rpm). Therefore, the dynamicisms must be modified or scaled to generate firing angle solutions that will operate the motor 14 within the specified speed range. Thus, the firing angle solution is still determined as a function of the dynamicisms, generally expressed by the equation:

Firing angle solution=$f$(dynamicisms).

For example, on one embodiment, the generic algorithm could be more specifically expressed by the following equation.

Look-up table address=$K_N$*dynamicism$N$+ . . . $K_2$*dynamicism2+$K_1$*dynamicism1+$K_0$;

where K is an offset or constant to bias the firing angle into the correct working range of operation for the particular implementation of the motor 14.

The address generated by the generic algorithm is input to the look-up table(s) and thereby utilized to output a corresponding firing angle solution stored in the look-up table(s). The content of the look-up table comprises a plurality of predetermined firing angles for the electronic valve 34. Thus, based on the input address, the corresponding firing angle contained in the look-up table is output to control the timing of the electronic valve 34.

The content of the look-up table(s) is predetermined based upon empirical data. In a preferred implementation, the empirical data used to determine the content of the look-up table(s) is the same data used to determine the generic firing angle control algorithm and all necessary constants $C_0$ to $C_{n+2}$, as described above. The look-up table(s) can be permanently programmed into the non-alterable memory device 66 or the alterable memory device 68 prior to, or subsequent to, the control module 10 being implemented into the specific tool. For example, 130, or 256, or 512 firing angle solutions for the electronic valve 34 could be stored in the look-up table(s) to be accessed by 130, or 256, or 512 addresses, or indexes, computed from the dynamicisms.

In a DC implementation wherein the motor 14 is a DC motor, as described below, the look-up table(s) are utilized to determine a pulse width modulated (PWM) duty cycle, or some other suitable control function for the motor 14. The address, or index, of the look-up table(s), as generated by the generic algorithm, is any one of, or any combination of, the dynamicisms suitably scaled or modified to accommodate the range of possible look-up table addresses, i.e. inputs. For example, the electronic valve 134 (shown in FIG. 3) has a duty cycle of 0% to 100 for normal DC power. Therefore, the dynamicisms must be modified or scaled to generate duty cycle solutions within the range of 0% to 100%. Similarly, the motor 14 may have some specified speed range, e.g. 0 to 5000 revolutions per minute (rpm). Therefore, the dynamicisms must be modified or scaled to generate duty cycle solutions that will operate the motor 14 within the specified speed range.

Thus, the duty cycle solution is also determined as a function of the dynamicisms, generally expressed by the equation:

Duty cycle solution=$f$(dynamicisms).

For example, on one embodiment, the generic algorithm could be more specifically expressed by the following equation.

Look-up table address=$K_N$*dynamicism$N$+ . . . $K_2$*dynamicism2+$K_1$*dynamicism1+$K_0$;

where K is an offset or constant to bias the duty cycle into the correct working range of operation for the particular implementation of the motor 14.

The address generated by the generic algorithm is input to the look-up table(s) and thereby utilized to output a corresponding duty cycle solution stored in the look-up table(s). The content, i.e. output, of the look-up table is the duty cycle solution, or other control function, for the electronic valve 34. As in the AC implementation, the look-up table(s) can be permanently programmed into the non-alterable memory device 66 or the alterable memory device 68 prior to, or subsequent to, the control module 10 being implemented into the specific tool. For example, 130, or 256, or 512 duty cycle, or other control function, solutions for the electronic valve 34 could be stored in the look-up table(s) to be accessed by 130, or 256, or 512 addresses, or indexes, computed from the dynamicisms.

The look-up tables can be multidimensional wherein the scaled or modified dynamicisms are used as X-coordinates, i.e. inputs, of a first look-up table and the Y-coordinate, i.e. output, of the first look-up table is then used as an X-coordinate, i.e. input, of a second look-up table. The Y-coordinate, i.e. output, of the second look-up table then yields the operational timing of the electronic valve 34, e.g. the firing angle or duty cycle solution.

It is envisioned that the use of a look-up table(s) as transfer functions could provide greater flexibility, significantly greater speed, and conserve space in the applicable memory device 66 or 68 than the use of the mathematical algorithm described above. More particularly, the computational burden would be removed from the real-time operation of the controller 26 having been transferred to the prior development of look-up table(s). The controller 26 need only look-up the correct firing angle or duty cycle, based on one or more of the plurality of dynamicisms, rather than compute the correct firing angle solution every full cycle, or multiple thereof.

In another embodiment, non-motor function tool operational parameters, e.g. tool features, can be programmed into the control module 10 using soft-coded coefficients. Such tool operational parameters control different tool operating features for different tool applications. For example, the tool operational coefficients can control such tool operating features as 'no-volt' tool operation, electronic clutch operation, thermal overload protection and brush wear indication. The tool features can be enabled and disabled within the particular tool, via execution of the generic control algorithm incorporating the soft-coded tool operational coefficients or utilizing the look-up table(s), as described above. Alternatively, the tool features can be enabled and disabled within the particular tool utilizing state diagrams, wherein the tool features can be sequenced between an operational state and a non-operational state depending on conditions defined by soft-coded tool operational coefficients.

Furthermore, the tool features can be enabled and disabled within the particular tool to control the operation features of the tool without affecting the motor performance, i.e. function, coefficients. The tool operational coefficients can be stored in the alterable memory device 68 or the non-alterable memory device 66 subsequent to the manufacturing of the motor control module 10 and can be either permanently resident within the control module 10 or uploaded as needed. More specifically, the tool operational coefficients can be programmed into the non-alterable memory device 66 prior to the control module 10 being installed into the tool or uploaded to the alterable memory device 68, via an external communication device, subsequent to the control module 10 being implemented in the tool. The external communication device could be any computer-based device capable of transmitting data, such as a laptop computer, a hand-held computer or any other programming device.

FIG. 3 is a simplified circuit diagram of a generic motor control module 100 that is effectively the same as the motor control module 10, described above, utilized in a DC implementation. For clarity and simplicity, components of the motor control module 100 that are substantially the same as components of the motor control module 10 are identified in FIG. 3 using the reference numerals of FIG. 1 incremented by 100. The motor control module 100 is connectable to a DC power source 190, such as a battery, at DC terminals 120a and 120b. The control circuit 118 includes a power supply 122 that supplies power to a controller 126, e.g. a microcontroller. The controller 126 includes a processor 130, e.g. a microprocessor, programmed to control an electronic valve 134, such as a bipolar transistor, a field effect transistor (FET), an insulated gate bipolar transistor (IGBT), or various voltage and/or current control devices. To control operation of the motor 114, the controller 126 controls the amount of current, and therefore voltage, applied to the motor 114 by controlling the operation of the electronic valve 134.

The control circuit 118 additionally includes a shunt resistor 138. The controller 126 includes an amplifier 156 used to amplify the voltage across the shunt resistor 138 used by the controller 126 to measure the current flowing through the electronic valve 134 and the motor 114. The control circuit 118 also includes a pair of pull-up resistors 158 and 160 used to condition the voltage input at a 'port 1' and a 'port 2' of the controller 126.

Generally, the motor control module 100 controls the operation of the motor 114 by switching the motor current on and off at periodic intervals, via the controller 126 and control signals applied to a control input 134a of the electronic valve 134. These periodic intervals are based on a pulse width modulated (PWM) duty cycle calculated by the controller 126. The duty cycle stipulates the time and duration that the electronic valve 134 is fired, thereby delivering electrical energy to the motor 114.

The motor control module 100 controls the operation of the motor 114 when a motor control switch 164, e.g. a tool On/Off switch, is placed in a closed (i.e. 'On') position, thereby allowing current to flow through the motor 114. Although motor control switch 164 is illustrated as being located between the node 120a and the motor 14, alternatively, the motor control switch 164 can be located between the node 120a and the DC power source 190. To determine the duty cycle, the dynamicisms are measured during operation of the motor 114. As described above, the dynamicisms include, but are not limited to, such things as a closed loop dial, an open loop dial, an amount of current flowing through the motor 114 during operation, the voltage across the motor 114 during operation, an amount of torque provided by the motor 114, and a speed of the motor 114. For example, a first input 158a could be a closed loop dial signal, or a tachometer signal or any other dynamicism signal. Likewise, a second input 158b could be a motor speed signal, or an open loop dial signal or any other dynamicism signal. Dynamicisms include any motor operational value or parameter that has an effect on the calculation of the duty cycle for the electronic valve 134. As the dynamicisms change during operation, the duty cycle will also change.

To generate a timing solution for the electronic valve 134, i.e. the timing and duration for which the electronic valve 134 is turned on, the processor 130 executes a universal generic control algorithm stored in a functionally non-volatile memory device 166 included in the controller 126. More specifically, to generate the duty cycle for the electronic valve 134 the processor 130 executes a universal generic duty cycle control algorithm. For example, memory device 166 could be a read only memory (ROM) device, a Flash Memory device or a one time programmable (OTP) device. Alternatively, the memory device 166 could be included in the motor control module 100 external to the controller 126.

In one preferred embodiment, the generic duty cycle algorithm is hard-coded in the memory device 166 during manufacturing of the motor control module 100. That is, the generic algorithm is stored in non-volatile memory device 166 as part of the process for manufacturing the motor control module 100 and can not be altered or modified once it is stored in the memory device 166. Thus, the generic algorithm is applicable to determine a timing solution, i.e. a duty cycle solution, for the electronic valve 134 for any of a plurality of motor applications in which any of a plurality of motors, such as motor 114, are controlled by the motor control module 100. More specifically, the generic algorithm determines a duty cycle solution for any motor 114 in which the motor control module 100 is installed, such that the motor 114 operates according to parameters specifically required for the particular motor application.

The processor 130 executes the generic algorithm utilizing the dynamicisms as inputs, thereby determining a duty cycle solution specific to the particular motor 114 and the specific motor application. Generally, the generic algorithm can be expressed by the following equation:

Duty cycle solution=f(dynamicisms)

For example, in one preferred embodiment, the generic algorithm could be more specifically expressed by the following equation.

Duty cycle solution=f(f(switch position)+(f(dial setting 1)+f(dial setting 2)+f(current)+f(voltage)+f(tachometer)+ . . . f(dynamicism n)+K)+M;

where 'switch position' refers to the position of the motor control switch 64, 'dial setting 1' refers to closed loop desired speed, 'dial setting 2' refers to open loop firing angle clamp, 'current' refers to the amount of current flowing through the motor 114, 'voltage' refers to a voltage value across the motor 114, and 'tachometer' refers to a tachometric period or rate of rotational speed of the motor. The motor control switch 164 controls the operational status of the motor 114. That is, if the motor control switch 164 is in an open position, the motor 114 is in an 'Off' operational status, while if the motor control switch 164 is in a closed position, the motor 114 is in an 'On' operational status.

The controller 126 samples the dynamicisms using appropriate sensors or sensing circuits (not shown) for each dynamicism and utilizes the processor 130 to execute the generic algorithm to determine the proper duty cycle solution for the electronic valve 134. Additionally, the generic algorithm utilizes at least one soft-coded function coefficient stored in a non-volatile alterable memory device 168 to determine the duty cycle solution such that the motor 114 functions in accordance with motor operational parameters specific to the particular application of the motor 114. Generally, the motor operational parameters of a given application will require the use of more than one function coefficient in the execution of the generic algorithm. Alterable memory device 168 can be any suitable memory device that allows data to be stored, read and altered such as flash memory, erasable programmable read-only memory (EPROM) or electrically erasable programmable read-only memory (EEPROM).

In one preferred embodiment, the function coefficient(s) are stored in the alterable memory device 168 subsequent to the manufacturing of the motor control module 100 and subsequent to the motor control module 100 being implemented in a particular application. An external device (not shown) capable of communicating with the controller 126 is used to program (i.e. store) the function coefficient(s) in the alterable memory device 168. The external device communicates the function coefficient(s) to the alterable memory device 168 over any suitable means for data transmission. For example, the function coefficient(s) can be transmitted from the external device to the alterable memory device 168 over battery terminals, e.g. terminals 20a and 20b, of the associated power tool. Alternatively, the module 100 could be programmed after its manufacture but before being implemented in a particular application.

A further derivation of the generic algorithm incorporating the function coefficient(s) can be expressed by summing the products of the dynamicism(s) and associated function coefficient(s), as illustrated by the following equation.

Firing angle solution=f((switch position*$C_0$)+((dial setting 1*$C_1$)+(dial setting 2*$C_2$)+(current*$C_3$)+(voltage*$C_4$)+(tachometer*$C_5$)+ . . . (dynamicism n*$C_n$)+$C_{n+1}$)$C_{n+2}$);

where the value for 'switch position' equals one (1) if the motor control switch 64 is in a closed (i.e. 'On') position and zero (0) if the motor control switch 64 is in an open (i.e. 'Off') position. Additionally, $C_0$, $C_1$, $C_2$, $C_3$, $C_4$, $C_5$ . . . $C_n$, $C_{n+1}$, $C_{n+2}$ are function coefficients specific to a particular application of the motor 114, so that the motor 114 operates in accordance with desired motor operational parameters of the particular application.

Thus, the processor 130 executes the generic algorithm, implementing the function coefficient(s) stored in alterable memory device 168, as a constant value(s) in the algorithm, and utilizing the dynamicism(s) as an input variable(s) to determine the duty cycle solution for the electronic valve 134. Since the dynamicism(s) is a variable, the calculated duty cycle solution will change during operation of the motor 114 due to variations in load requirements for the motor 114 and changes in function settings of the device in which the motor 114 is installed. For example, if the load requirement of the motor 114 changes during operation, the dynamicism for the current and/or the voltage being used by the motor 114 will change leading to a change in the duty cycle solution to compensate for the change in power needed by the motor 114. Additionally, if a user changes the speed setting on a power drill, the associated dynamicism(s) will change, thereby altering the duty cycle solution generated by the generic algorithm.

Although, in the various preferred embodiments described herein, the motor control module 100 has been described to execute the generic algorithms shown above, it should be appreciated that the particular algorithm described is exemplary only. As such the description of the exemplary algorithm does not exhaust all possible algorithms for use in implementing the motor control module 100, in accordance with the present invention. Accordingly, changes in the algorithm described above may be made by those skilled in the art without departing from the scope of the invention. For example, the generic algorithm could utilize a look-up table as a transfer function to generate duty cycle solutions, as described above. Additionally, although the DC implementation of the control module 118 has been described above utilizing a PWM duty cycle to determine the timing of the electronic valve 134, it should be understood that any suitable discrete control function could be utilized and remain with the scope of the invention.

Additionally, although various preferred embodiments described herein disclose a controller, e.g. a microcontroller, implementation of the motor control module 10, it should be understood that the motor control module 10 may also utilize other forms of digital circuitry. That is, the control circuit 18 of the motor control module 10 can include any electrical and semiconductor devices suitable to sample the dynamicism(s) and execute the generic algorithm, as described above. For example, control circuit 18 could be a discrete digital logic integrated circuit, or an application specific integrated circuit (ASIC), or a combination of digital and analog circuitry, or any combination thereof.

Figure 4:
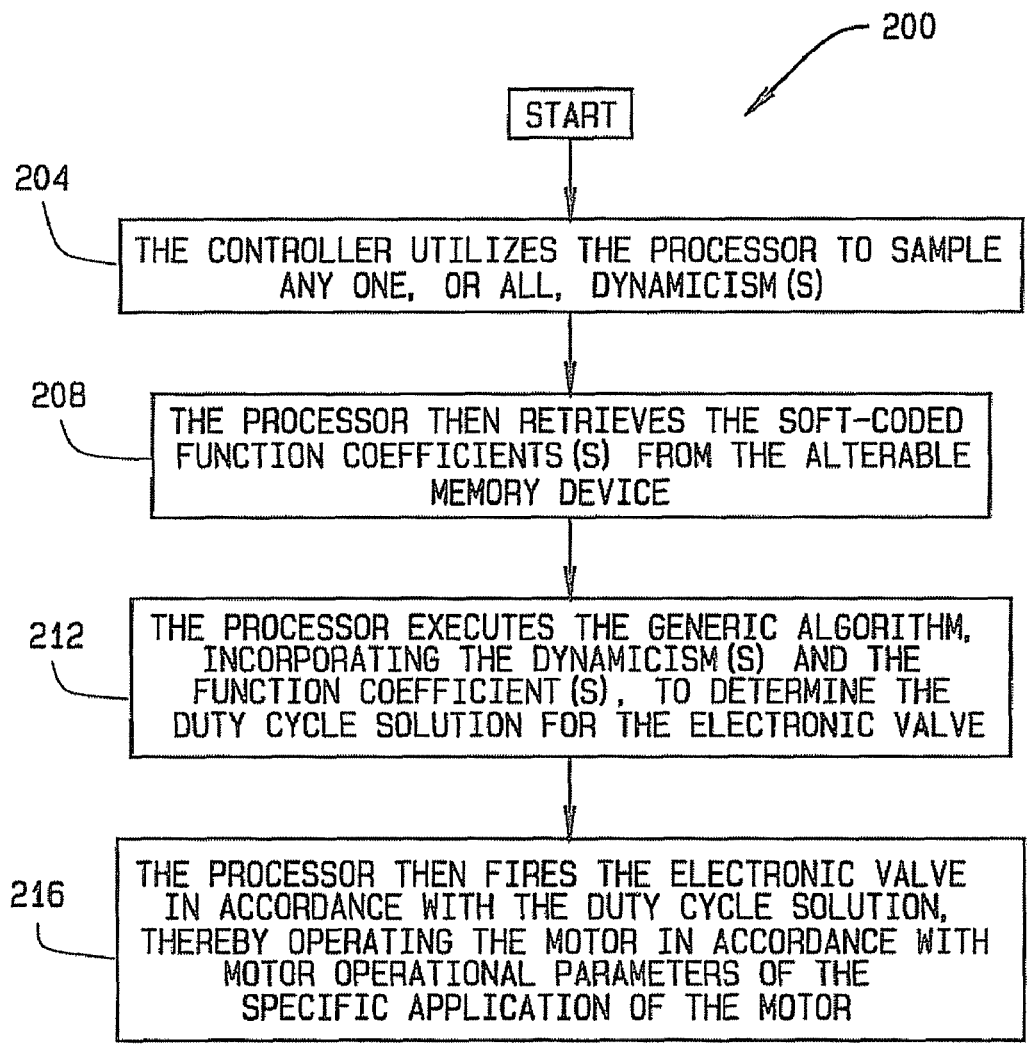
FIG. 4 is a flow chart illustrating the general operation of the generic motor control module in a DC implementation, shown in FIG. 3.

FIG. 4 is flow chart 200 illustrating the general operation of the motor control module 100 (shown in FIG. 2), in accordance with one preferred DC embodiment of the present invention. In a practical application of the motor control module 100, the controller 126 utilizes the processor 130 to sample any one, or all, dynamicism(s), as indicated at step 204. The processor 130 then retrieves the soft-coded function coefficient(s) from the alterable memory device 168, as indicated at step 108. After retrieving the function coefficient(s), the processor 130 executes the generic algorithm, incorporating the dynamicism(s) and the function coefficient(s), to determine the duty cycle solution for the electronic valve 134, as indicated at step 112. The processor 130 then fires the electronic valve 134 in accordance with the duty cycle solution, thereby operating the motor 114 in accordance with motor operational parameters of the specific application of the motor 114, as indicated at step 116.

While the invention has been described in terms of various specific embodiments, those skilled in the art will recognize that the invention can be practiced with modification within the spirit and scope of the claims.

What is claimed is:

1. A power tool comprising:
a motor selected from one of a plurality of different motors, wherein the plurality of motors has motors having at least one of a different size, a different operational rating and a different type tailored to meet the specific operational needs of the power tool;
a motor control module having stored therein a generic control algorithm executable to control operation of the selected motor;
wherein the motor control module is programmed with at least one parameter utilized as a constant during execution of the generic control algorithm to transform the generic control algorithm from a non-tool-specific algorithm into a tool-specific algorithm specifically suited for controlling the operation of the power tool and the selected motor.

2. The power tool of claim 1, wherein the at least one parameter comprises at least one of:
a non-motor specific parameter associated with a feature of the power tool;
a motor-specific parameter for tailoring performance of the selected motor to the operational requirements of the power tool; and
a look-up table utilized as a transfer function during execution of the non-tool-specific algorithm.

3. The power tool of claim 2, wherein the motor control module is adapted to store a state diagram for enabling and disabling the non-motor specific parameter.

4. The power tool of claim 1, wherein the motor control module is further programmed with operating criteria for the selected motor utilized as variables during execution of the generic control algorithm, the selected motor operating criteria being periodically sampled during operation of the power tool.

5. The power tool of claim 4, wherein the motor operating criteria comprises at least two of:
a trigger position;
a closed loop dial;
an open loop dial;
a current flow through the selected motor;
a voltage across the selected motor; and
a selected motor speed.

6. The power tool of claim 1, further comprising a processor adapted to execute the generic control algorithm to generate a timing solution for controlling a flow of current through the selected motor so that operation of the selected motor is tailored in accordance with specific desired performance parameters of the power tool.

7. The power tool of claim 6, wherein the timing solution comprises a firing angle solution for controlling the operation of an electronic valve, the electronic valve being configured to control the flow of AC current through the selected motor.

8. The power tool of claim 6, wherein the timing solution comprises a duty cycle solution for controlling the operation of an electronic valve configured to control the flow of DC current through the selected motor.

9. A power tool comprising:
a motor selected from one of a plurality of different motors, wherein the plurality of motors has motors having at least one of a different size, a different operational rating and a different type tailored to meet the specific operational needs of the power tool;
a motor control module having stored therein a generic control algorithm executable to control operation of the selected motor;
the motor control module being programmed with at least one parameter utilized as a constant during execution of the generic control algorithm to transform the generic control algorithm from a non-tool-specific algorithm into a tool-specific algorithm specifically suited for controlling the operation of the power tool and the selected motor;
the at least one parameter including at least one of:
a non-motor specific parameter associated with a feature of the power tool; and
a motor-specific parameter for tailoring performance of the selected motor to the operational requirements of the power tool.

10. The power tool of claim 9, wherein the at least one parameter includes a look-up table utilized as a transfer function during execution of the non-tool-specific algorithm.

11. The power tool of claim 9, wherein the motor control module is adapted to store a state diagram for enabling and disabling the non-motor specific parameter.

12. The power tool of claim 9, wherein the motor control module is further programmed with operating criteria for the selected motor utilized as variables during execution of the generic control algorithm, the selected motor operating criteria being periodically sampled during operation of the power tool.

13. The power tool of claim 9, further comprising a processor adapted to execute the generic control algorithm to generate a timing solution for controlling a flow of current through the selected motor so that operation of the selected motor is tailored in accordance with specific desired performance parameters of the power tool.

14. The power tool of claim 13, wherein the timing solution comprises one of:
a firing angle solution for controlling the operation of an electronic valve, the electronic valve being configured to control the flow of AC current through the selected motor; and
a duty cycle solution for controlling the operation of an electronic valve configured to control the flow of DC current through the selected motor.

15. The power tool of claim 9, wherein the motor operating criteria comprises at least two of:
a trigger position;
a closed loop dial;
an open loop dial;
a current flow through the selected motor;
a voltage across the selected motor; and
a selected motor speed.

* * * * *